United States Patent [19]

Mikhalev et al.

[11] 4,059,374
[45] Nov. 22, 1977

[54] DEVICE FOR PREPARING POLYMER ARTICLES FROM MONOMERS

[76] Inventors: Nikolai Alexandrovich Mikhalev, prospekt Tsiolkovskogo, 79a, kv. 64; Boris Petrovich Shtarkman, prospekt Lenina, 65, kv. 63; Jury Ivanovich Gladyshev, ulitsa Avtomobilnaya, 21, kv. 6, all of Dzerzhinsk Gorkovskoi oblasti, U.S.S.R.

[21] Appl. No.: 751,523

[22] Filed: Dec. 16, 1976

[51] Int. Cl.² ................................. B29F 3/02
[52] U.S. Cl. ................... 425/207; 425/378 R; 425/550; 425/567; 366/69; 366/149
[58] Field of Search ........... 425/200, 207, 378, 243, 425/247, 376; 259/185, 4 R

[56] References Cited

U.S. PATENT DOCUMENTS

| 2,425,237 | 8/1947 | Field | 259/4 R |
|---|---|---|---|
| 2,951,061 | 8/1960 | Gomory | 259/4 R |
| 3,423,073 | 1/1969 | Arge | 259/4 R |
| 3,656,716 | 4/1972 | Ljungerg | 259/4 R |
| 3,701,618 | 10/1972 | Wall et al. | 425/376 R |
| 3,874,643 | 4/1975 | Lorenian | 259/185 |

FOREIGN PATENT DOCUMENTS

| 184,034 | 5/1963 | Sweden | 425/542 |

Primary Examiner—Richard B. Lazarus
Assistant Examiner—W. R. Briggs
Attorney, Agent, or Firm—Lackenbach, Lilling & Siegel

[57] ABSTRACT

The proposed device for producing polymer articles from monomers is characterized in that the means for preparing the polymer melt is made in the form of at least one chamber of elastic material, the height of which is several times less than its width and length. Said chamber is placed inside a heated housing filled with a medium intended to exert the required pressure on the chamber walls.

10 Claims, 13 Drawing Figures

DEVICE FOR PREPARING POLYMER ARTICLES FROM MONOMERS

This invention relates to devices for preparing and processing polymers, and more particularly it relates to devices for producing polymer articles from monomers.

The invention can be used in chemical industry, where various polymers and also articles made from them are widely used, as well as in medicine, machine building, etc.

The starting material is any monomer that can be polymerized in the presence of initiators, catalysts, chain regulators agents controlling the molecular weight of the produced polymer, and other additives. Methyl methacrylate, styrene, etc., are examples of such monomers.

Known in the prior art are machines for injection moulding of polymer articles, comprising a feeding hopper for the starting material, a heated housing provided with a piston or a screw, and a mould.

The starting material used with these machines is powdered or granulated polymer. The finished article is produced with such machines by plasticizing the material (melting the polymer) with its subsequent injection into the mould.

Powdered or granulated polymer is prepared from a monomer, outside the machine. This is a laborious operation and moreover the material can readily absorb atmospheric moisture and accumulate dust on its surfaces due to static electricity.

To prepare high-quality articles, it is necessary to preliminarily dry the starting material for a long time and to protect it from external contaminants.

A more effective device is one in which polymer articles are prepared directly from a monomer, i.e., a polymer and an article of this polymer are produced directly in the same device.

These devices comprise a mould consisting of stationary and movable members with an elastic gasket placed between the mating surfaces of the mould.

The mould is filled with the monomer, specially prepared for polymerization, and then heated to the required temperature. As the starting material is polymerized, its initial volume shrinks and the movable member of the mould is advanced (due to compression of the elastic gasket) to compensate for the shrinkage.

The devices have the following disadvantages:

the necessity to compensate for the shrinkage of the initial volume of the monomer, as it is polymerized in the mould, sets limitations to the range of shapes into which the starting material can be worked;

in cases where thick-wall objects are manufactured, (e.g., from methyl methacrylate), it becomes difficult to withdraw heat of the exothermic reaction of polymerization and the material in the mould can be overheated due to its poor heat transfer properties;

at relatively high temperatures, that may be necessary to accelerate the polymerization process (e.g., polymerization of methyl methacrylate at a temperature of over 100° C), the material might stick to the mould walls and it would be difficult to extract the finished article from the mould;

in the process of monomer polymerization under pressure it is necessary to thoroughly tighten the mating surfaces of the mould with a gasket; after use the gasket should be removed and this involves additional labor;

the cost of moulds for the manufacture of intricate configurations is comparatively high and in order to ensure higher productivity, the machine must be provided with a great number of such moulds, since the time of polymerization is comparatively long all this increases the overall cost of the plant.

Many disadvantages inherent in such devices have been successfully avoided in machines where the processes of preparing the melt, and of moulding the article from it, are separated from one another. An exemplary device is an injection machine for plastics comprising a flexible thin-walled vessel placed inside a heated housing and communicated with the chamber of the cylinder provided with a piston, the chamber being connected with the mould (See Pat. No. 1,146,654 of German Federal Republic).

The starting material, the irreversibly solidifying fibre-filled plastic, is placed into a flexible thin-walled vessel, which is located inside a housing, the bead of the vessel being fixed in the tapered junction of the housing. The material is heated in the vessel to prepare a melt which is forced out by the pressure of liquid delivered into the housing on the other side of the vessel wall, into the chamber of the cylinder, from which the melt is delivered by the piston into the mould.

As the melt is heated and then cooled in the mould, the fibre-filled material is polymerized and irreversibly set.

The disadvantage of this machine is that in order to repeat the cycle, the flexible thin-walled vessel should be removed from the housing, cleaned from residues of the irreversibly set plastic, filled with a new portion of the material, and placed again into the heated housing. The process of heating the material until it will flow is relatively long, since the heat transfer coefficient of plastics is low. This is the cause of the low productivity of the plant.

As the irreversibly setting plastics are heated, they start polymerizing, the process being accompanied by liberation of heat, the withdrawal of which is difficult owing to the poor heat conductivity of the material, which is even more difficult with thick layers of the material contained in the thin-walled vessel. The material might thus be over heated and decomposed.

Melting the monomer, and then moulding the article out of this monomer (e.g., methyl methacrylate) is difficult also due to an inadequate withdrawal of heat of the exothermic reaction of polymerization from the portions of the material that are located further from the vessel walls. As a result, the material is overheated and the initiating agent decomposed. The obtained polymer can depolymerize under the action of very high temperatures and part of the monomer will remain unpolymerized, i.e., the polymer melt will contain much residual (non-polymerized) monomer, and the melt cannot be used for the manufacture of articles.

The polymer melt cannot be discharged directly into the mould and the machine therefore requires an intermediate chamber provided with a piston. Otherwise the mould cannot be filled completely with the polymer melt, since the speed of the melt discharge from the thin-walled vessel is low and non-uniform, i.e., the speed can significantly decrease toward the end of the process of the melt discharge from the mould. This is explained by the resistance to the melt flow at the outlet of the vessel being far less than the resistance to the discharge of the material farther from the exit. For this reason, the melt in the vicinity of the outlet from the vessel is displaced from it at a greater volumetric speed, as a result of which the flexible thin wall of the vessel above the outlet quickly approaches it to produce even greater resistance to the flow of the melt, and in cases with high viscosity materials it can even stop the flow. Much melt can thus remain in the vessel and the article moulded can be defective.

It is more advantageous to operate a device comprising two vessels: for the monomer with the catalyst and the monomer with the activating agent, the vessels being communicated through pipes and batching devices with heated housing incorporating a piston and a blade to stir the monomer and to direct it into the mould.

The mixture of the monomer with the catalyst and the monomer with the activator is batched at the required ratio and in the required quantity from the vessels, through the pipes, into the chamber of the heated housing, where the monomer starting materials are mixed by a rotating piston with the blade, or by the blade alone placed inside the piston. The monomer is polymerized to convert into a polymer melt and is discharged by a piston into the mould where the polymerization process is completed and the required article shaped. To compensate for the shrinkage of the material in the mould during the final polymerization, the piston continues delivery of the material into the mould.

The disadvantage of the device is that the material to be processed requires thorough mixing to ensure monomer polymerization and to withdraw heat of the exothermic reaction from the housing chamber. It is difficult to attain this in the mould, and as a result, the properties of the polymer in the article will be non-uniform through its volume, i.e., much residual monomer might remain non-polymerized in the article especially if the article is thick. Such articles might even have voids in their thick walls. Moreover, the piston and the blade perform rotation and reciprocating motion inside the housing, which requires tight contact between the frictional surfaces, since the material could be of low viscosity, while its delivery into the mould should be effected under pressure.

The main object of the invention is to provide a device for producing polymer articles from monomers, comprising a means for preparing a polymer melt, that ensures high productivity at the stage of preparing the melt and ensures its uniformity.

The other object of the invention is to ensure uniformity of the polymer melt issue, and to ensure its high speed delivery into the mould.

One more object of the invention is to provide a device that will eliminate adhesion of the polymer to the mould and will ensure shrinkage of the monomer in the process of its polymerization outside the mould.

The specific object of the invention is to provide a device for producing polymer articles from monomers provided with means for preparing polymer melt. The device design will ensure high productivity at the step of preparing the polymer melt from the monomer, its uniformity, and reliable filling of the mould with the melt.

The object has been attained in a device for producing polymer articles from monomers, comprising a means for preparing a polymer melt out of the monomer, having an inlet communicated with the source of the monomer, and an outlet communicated with the moulding device, in which, according to the invention, the means for preparing the polymer melt is made in the form of at least one chamber made from a resilient material whose height is many times less than its length and width, placed inside a heated housing filled with a medium intended to exert the required pressure onto the chamber walls.

The chamber can be formed out of two sheets sealed hermetically along the periphery.

It is recommended that the chamber had an outlet channel adjoined to its surface and communicated with the monomer inlet and the polymer melt outlet, and also to the chamber cavity.

A version is also possible in which the outlet channel is communicated with the chamber cavity through a longitudinal slot.

Still another version is possible in which the outlet channel is communicated with the chamber cavity through a series of openings located on its surface, the section area of these openings decreasing and the distance between the openings increasing toward the polymer melt outlet.

Moreover, the chamber can be formed by two sheets sealed hermetically on the periphery with an elastic pleated partition and provided with at least one inlet channel communicated with its cavity through a slot located closer to the chamber center, and some outlet channels communicated with the chamber cavity through several openings.

It is recommended that the device have several means for preparing the polymer melt so that the productivity of the installation on the whole can be increased.

The essence of the proposed invention consists in the following.

The device for producing polymer articles from monomers should be provided with a means for preparing a polymer melt out of a monomer, made in the form of a flexible resilient chamber the height of which is several times less than its length and width. The chamber is placed inside a heated housing filled with a medium that will exert pressure on the chamber walls.

This construction of the chamber makes it possible to ensure high productivity at the step of preparing the polymer melt out of the corresponding monomer and to ensure its uniformity. The monomer in the chamber is present in a thin layer which facilitates its quick and uniform heating to the required temperature and adequate withdrawal of heat of the exothermic reaction of polymerization. In other words, the monomer material is converted in the chamber into the polymer melt under conditions that are close to the isothermic, which ensures uniformity of the molecular weight and viscosity of the melt throughout its whole mass, and this in turn ensures good quality of the polymer articles.

Furthermore, the design of the means for preparing the polymer melt makes it possible to polymerize the monomer at relatively high temperatures that ensure high rate of the monomer conversion into the polymer melt. The resilient properties of the chamber walls ensure an effective transfer of the medium pressure onto the monomer material in the process of its conversion and prevent its boiling under the action of high temperatures and formation of pores, and also ensures shrinkage of the material during its polymerization with subsequent injection of the molten polymer into the mould.

The design of the chamber made in the form of two sealed sheets sealed on the periphery is very simple.

The fact that the chamber is provided with an outlet channel, adjoining the surface of the chamber and communicating with the monomer inlet and the polymer melt outlet, and the cavity of the chamber through a slot, makes it possible to ensure complete displacement of relatively viscous polymer melt from the chamber into the mould at a more uniform and higher speed compared with the version in which the chamber has no outlet channel but is connected directly with the monomer inlet and the polymer melt outlet through openings located on its surface. This is explained by that in the version with the chamber without the outlet channel, the resistance to the melt flow is different along the chamber due its varying section, the least resistance being at points closer to the outlet, while the pressure exerted on the melt inside the chamber is constant. Because of this, the volumetric rate of the melt transfer through various parts of the chamber can also be different. As a result, the chamber walls can be deformed to a different extent under the action of pressure of the medium: at points closer to the outlet, the chamber walls are brought together faster, and the issue of the material from the chamber is thus obstructed.

In the version where the chamber is provided with the outlet channel and is communicated with it through a longitudinal slot, the resistance to the melt current in the chamber is lower, since the melt moves in the chamber not in the longitudinal direction (in the direction from the inlet to the outlet, between permanently approaching walls) but mainly from the periphery of the chamber toward the slot in the outlet channel, the resistance does not change.

Another version, in which the outlet valve is communicated with the chamber through a series of openings located on its surface, and whose section decreases and the distance between which increases in the direction toward the outlet, ensures more complete displacement of the highly viscous material polymer melt from the chamber into the mould at a higher and uniform rate. In the previous version, in which the outlet channel is connected with the chamber cavity through the slot, the resistance to the melt current at the point closer to the outlet is less than the resistance of the melt current farther from the outlet. As a result, it is difficult to attain the required uniformity and high rate of filling of the mould with the polymer melt having higher viscosity. In the version where the outlet channel is connected with the chamber cavity through openings on its surface, the section of the openings decreasing and the distance between them increasing toward the polymer melt outlet, the resistance to the melt current from various parts of the chamber of equalized along the chamber length.

The chamber design will be more effective if the chamber is formed by two sheets sealed hermetically along the periphery with an elastic pleated partition and is provided with at least one inlet channel communicated with its cavity through a slot located closer to the center of the chamber, and a few outlet channels communicated with the chamber cavity through several openings.

This design of the chamber ensures more uniform (compared with the previous versions) thickness of the monomer layer in the chamber which ensures optimum conditions for its polymerization that affect the uniformity of the polymer melt with respect to the molecular weight and viscosity.

The fact that the chamber is provided with the inlet channel for the monomer connected with the chamber cavity through a slot located closer to the chamber center, ensures uniform deformation of the chamber and formation of a uniform layer of the monomer throughout the entire volume at the moment of its introduction into the chamber and, moreover, the fact that the chamber is provided with several outlet channels connected with its cavity through several openings, ensures maximum high and uniform rate of filling of the mould with the polymer melt of high viscosity, e.g., the melt of the polymer prepared from methyl methacrylate. This can be difficult with the version in which the chamber is provided with the outlet channel that serves simultaneously as the inlet channel. As the chamber is filled with monomer, it enters the chamber in that part of its cavity that is closer to the inlet, and the chamber is resiliently deformed at this point to an extent higher than at points closer to the outlet, i.e., the thickness of the monomer layer at this point can be higher and the conditions for polymerization of the monomer can be unequal. As the polymer melt is displaced from the chamber, it moves from the periphery toward the center, i.e., into the outlet channel between the walls that are constantly brought together, which increases the resistance to the melt current as it is being displaced.

If the chamber is provided with several outlet channels, the resistance to the polymer melt outlet is minimum, and moreover, the melt is displaced into the outlet channels through the openings from the whole volume of the chamber simultaneously, while the resistance to the polymer melt flow is not increased as the walls are brought together.

Owing to the fact that the device is provided with several means for preparing the polymer melt, out of which the melt is alternately delivered into one mould, it is possible to considerably increase the productivity of the device on the whole, in particularly, in the manufacture of polymer articles from monomers, the time of polymerization of which is rather significant.

This invention makes it possible to increase the productivity of the device for producing polymer articles from monomers, and improve the quality of the article produced.

The construction of the device for preparing the polymer melt from monomers makes it possible to carry out the polymerization process under high pressures (e.g., in the case with polymerization of methyl methacrylate, to 3–5 thousand kg/sq.cm). Under these conditions the time of polymerization can be minimized and the optimum productivity of the device can be attained using only a single means for preparing the polymer melt.

Other advantages and objects of the present invention will become subsequently clear from the detailed description of an exemplary embodiment of the invention and from the accompanying drawings in which.

Figure 3:
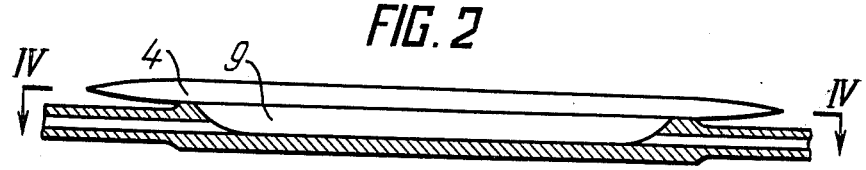
Figure 4:
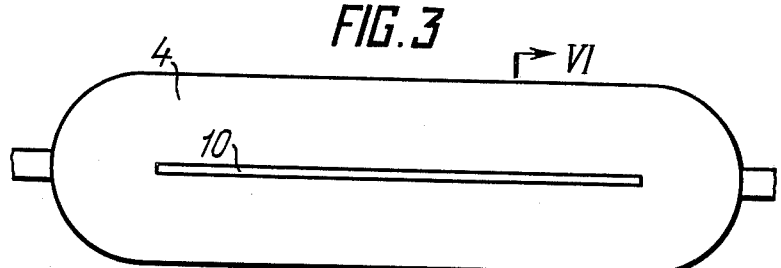
Figure 5:
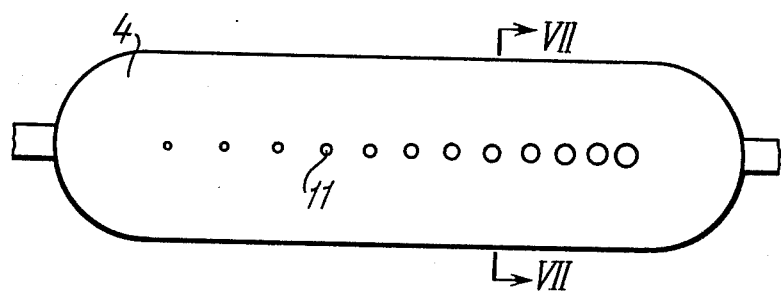
Figure 6:
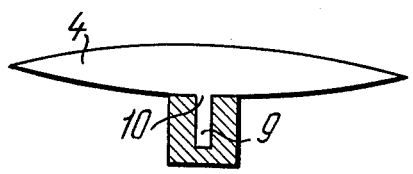
Figure 7:
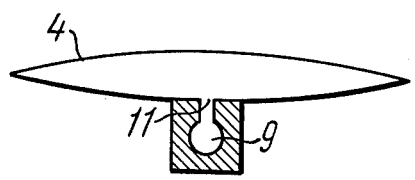
Figure 8:
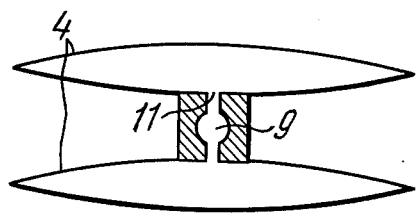
Figure 9:
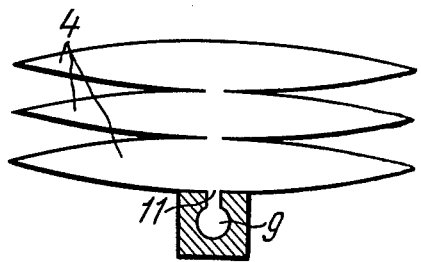
Figure 10:
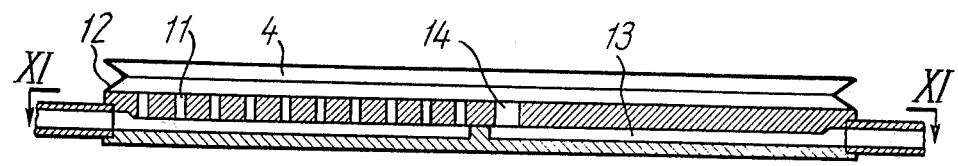
Figure 11:
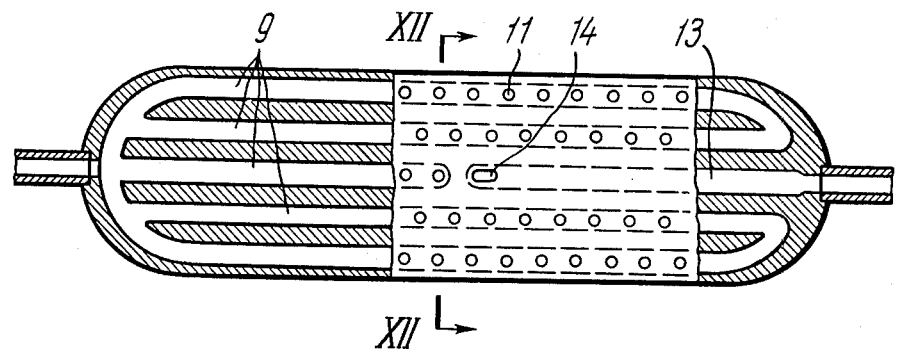
Figure 12:
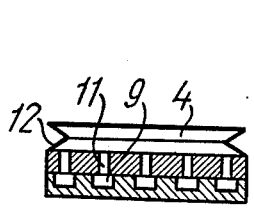

FIG. 3 a version of the chamber with the outlet channel, longitudinal section;

FIG. 4 is a section on IV — IV in FIG. 3;

FIG. 5 is another version of the chamber with the outlet channel, top sectional view;

FIG. 6 is a section on VI—VI in FIG. 4;

FIG. 7 is a section on VII—VII in FIG. 5;

FIG. 8 is a version of the device for preparing polymer melt with two chambers (housing is not shown), cross section;

FIG. 9 shows the same, with three chambers;

FIG. 10 is another version of the chamber, longitudinal section;

FIG. 11 is a section of XI—XI in FIG. 10;

FIG. 12 is a section on XII—XII in FIG. 11; and

Figure 13:
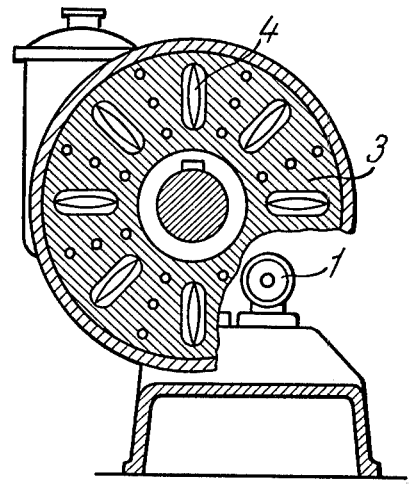

FIG. 13 is a version of the device with several means for preparing polymer melt, cross section.

The device for producing polymer articles from monomers comprises the source of a monomer 1 (FIGS. 1 and 2), a mould 2 and a means for preparing a polymer melt out of the monomer, which in turn comprises a heated housing 3, with a cylindrical or slotted cavity and a chamber 4, the walls of which are made out of a resilient material. The height of the chamber 4 is several times less than its length and width, i.e., the chamber is actually formed by two resilient sheets sealed hermetically along the periphery. The chamber 4 is located inside the housing 3 and has an inlet for the monomer, which is in fact an inlet valve 5, and an outlet for the molten polymer which is actually an outlet valve 6 with a nozzle 7.

The interior of the housing 3, on the outside of the chamber 4, is filled with a medium, e.g., liquid, gas, or solid substance. The medium is present in the housing 3 under constant low pressure which is equal to or slightly higher than the vapour pressure of the monomer at the required temperature, and at the desirable moment its pressure increases. The medium serves to transfer the heat and pressure through the walls of the chamber 4 onto the monomer.

The source of the monomer 1 can be connected to or disconnected from the inlet valve 5 by any known method. (The same refers to the mould 2 and the nozzle 7).

A control throttle 8 can be installed before the outlet valve 6 that serves to produce the required resistance to the current of the polymer melt (depending on its viscosity) at the moment of filling the mould 2 and thus to ensure complete displacement of the melt from the chamber 4.

According to another version, the chamber 4 is provided with an outlet channel 9 (FIGS. 3, 4, 6) adjoining its surface and communicating with the interior of the chamber 4 through a longitudinal slot 10.

According to a third version, the chamber 4 has the outlet channel 9 (FIGS. 5, 7) that is connected with its interior through several holes 11, the sectional area of which decreases and the distance between which increases toward the polymer melt outlet.

In these versions, the monomer inlet is located at one end and the polymer melt oulet at the other end of the outlet channel 9.

The section of the outlet channel 9 can be made of any configuration, e.g., rectangular, trapezoidal, or round, and constant throughout its length, or decreasing toward the polymer melt outlet.

In other versions, the means for preparing the polymer melt is made with several resilient chambers 4 interconnected therebetween and adjoining one outlet channel 9 (FIGS. 8, 9). Such versions of the device make it possible to increase the volume of the obtained polymer article, the dimensions of the housing 3 remaining the same.

In still another version, the chamber 4 is made of two sheets sealed hermetically on the periphery with an elastic pleated partition 12 (FIGS. 10, 11, 12). The chamber 4 of this device is provided with one inlet channel 13 communicated with its interior through a slot 14, and five outlet channels 9 communicating with the chamber 4 through several openings 11.

The device for producing polymer articles from monomers can be provided with several means for preparing the melt (FIG. 13), each of which is essentially an interior of the heated housing 3 with the chamber 4 inside it. The device is also provided with a single source of the monomer 1 and one mould (not shown in the figure). The housing 3 can perform intermittent rotation.

The source of the monomer 1 and the mould are located so (in relation to the housing 3) that if, for example, the inlet of the first means for preparing the polymer melt is (at a certain position of the housing 3) opposite the source of the monomer 1, the outlet of the latter is opposite the mould.

The described device for producing polymer articles from monomers operates as follows.

Figure 1:
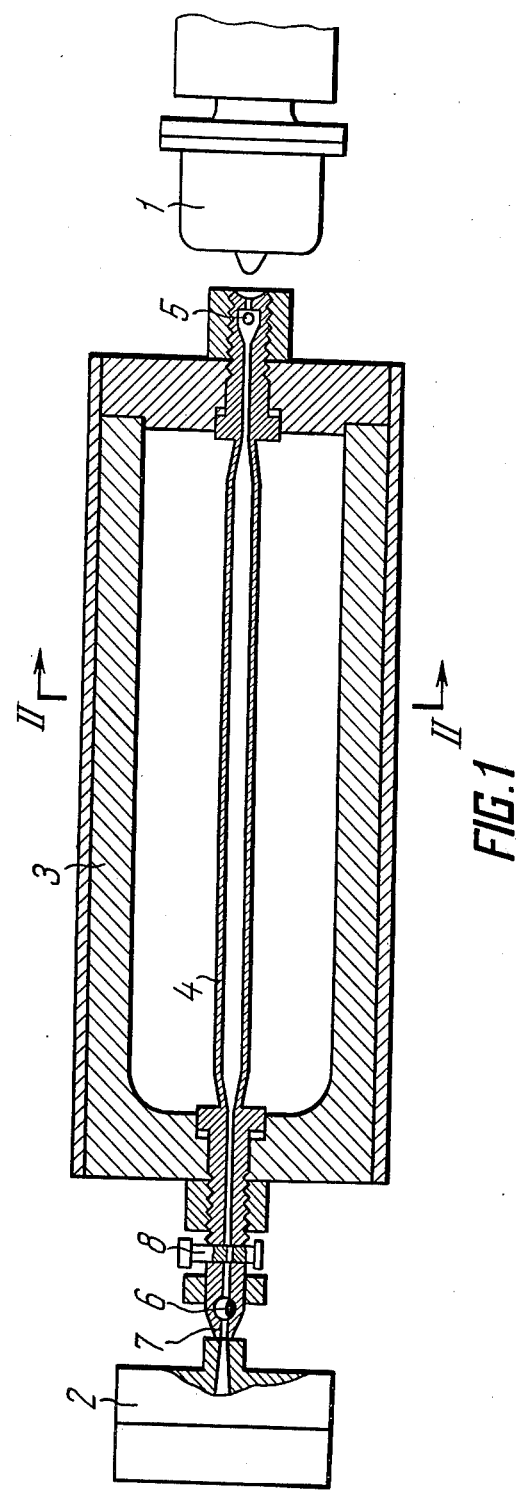
FIG. 1 is a schematic diagram of the device for producing polymer articles from monomers, longitudinal section.
Figure 2:
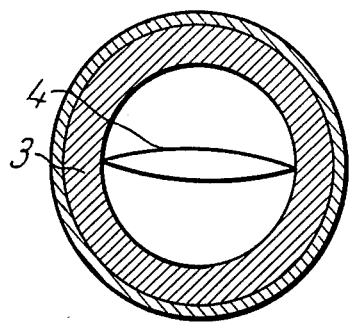
FIG. 2 is a section on II — II in FIG. 1.

The source of the monomer 1 is brought to the inlet (i.e. the inlet valve 5) of the means for preparing the polymermelt and the measured portion of the monomer is introduced under pressure directly into the chamber 4, as shown in FIG. 1, or through the outlet channel 9 (FIGS. 3 - 9), or else through the inlet channel 13 (FIGS. 10 - 12).

As the chamber 4 has been filled, the source of the monomer 1 is removed from the inlet valve 5.

The walls of the chamber 4 undergo elastic deformation as a result of which the monomer acquires the form of a thin layer. This makes it possible to heat the monomer quickly and uniformly to the required temperature (at which polymerization is free to set in) and to effectively withdraw the heat of the exothermic reaction of polymerization.

As the medium inside the housing 3 presses on the elastic walls of the chamber 4, the shrinkage of the monomer in the process of its polymerization is compensated for.

The monomer is converted into the polymer melt under the action of the initiating agent and the temperature. The required pressure is then built up in the housing 3, and the mould 2 is brought to the outlet from the means for preparing the polymer melt, viz., the nozzle 7. The molten polymer is injected from the chamber 4 by virtue of high pressure that the medium exerts on the chamber walls, straight into the mould 2 (or through the outlet channel 9). The melt is cooled in the mould to set in the required shapes. The article is then extracted from the mould, as the latter is moved away from the nozzle 7.

The next polymer article is producing by repeating the procedure.

The present invention makes it possible to prepare polymer articles of higher molecular weight compared with the articles manufactured with the known machines, since in the proposed device, the polymer melt is prepared directly from the monomer, i.e., the step of the polymer plasticizing is dispensed with.

Moreover, with the proposed device it becomes possible to obtain large and multicolored polymer articles on machines of the same dimensions, if several chambers are installed inside the interior of the housing of the means for preparing the polymer melt, each chamber being provided with separate inlets for the monomer and one or several outlets for the polymer melt.

We claim:

1. A device for producing polymer articles from monomers, comprising: a source having means to supply a monomer, a mold, a means for preparing a polymer melt out of the monomer having an inlet communicating with said source of the monomer and an outlet communicating with said mold, at least one chamber having walls constructed of a flexible resilient material, said chamber being disposed intermediate said inlet and said outlet and having means communicating therewith, said chamber having a height several times less than its length and width, said chamber being disposed in a housing, said housing confining therein a medium, means to pressurize said medium to thereby exert pressure on the walls of said chamber, and means operable to heat said housing and said medium to thereby heat said chamber and the melt therein.

2. A device according to claim 1, in which the chamber is formed by two sheets sealed together hermetically along the periphery.

3. A device according to claim 1, in which the chamber has an outlet channel adjoining its surface and communicating with said inlet and outlet, and the chamber interior.

4. A device according to claim 2, in which the chamber has the outlet channel adjoining its surface, communicating with said inlet and outlet, and the chamber interior.

5. A device according to claim 3, in which the outlet channel communicates with the chamber interior through a longitudinal slot.

6. A device according to claim 4, in which the outlet channel communicates with the chamber interior through a longitudinal slot.

7. A device according to claim 3, in which the outlet channel communicates with the chamber interior through several openings located on its surfaces, the section of said openings decreasing and the distance between said openings increasing in the direction of said polymer melt outlet.

8. A device according to claim 4, in which the outlet channel communicates with the chamber interior through several openings located on its surface, the section of said openings decreasing and the distance between said openings increasing in the direction of said polymer melt outlet.

9. A device according to claim 1, in which the chamber is formed by two sheets sealed together hermetically along the periphery with an elastic pleated partition, and said chamber being provided with at least one inlet channel communicating with its surface through a slot, located close to the chamber centre, and several outlet channels communicating with the chamber cavity through several openings.

10. A device according to claim 1, in which a plurality of chambers communicate with said inlet and said outlet to prepare the polymer melt.

* * * * *